No. 669,941. Patented Mar. 12, 1901.
F. M. GILBERT & G. K. WHEELER.
ELECTRIC SWITCH.
(Application filed Dec. 17, 1898.)
(No Model.)
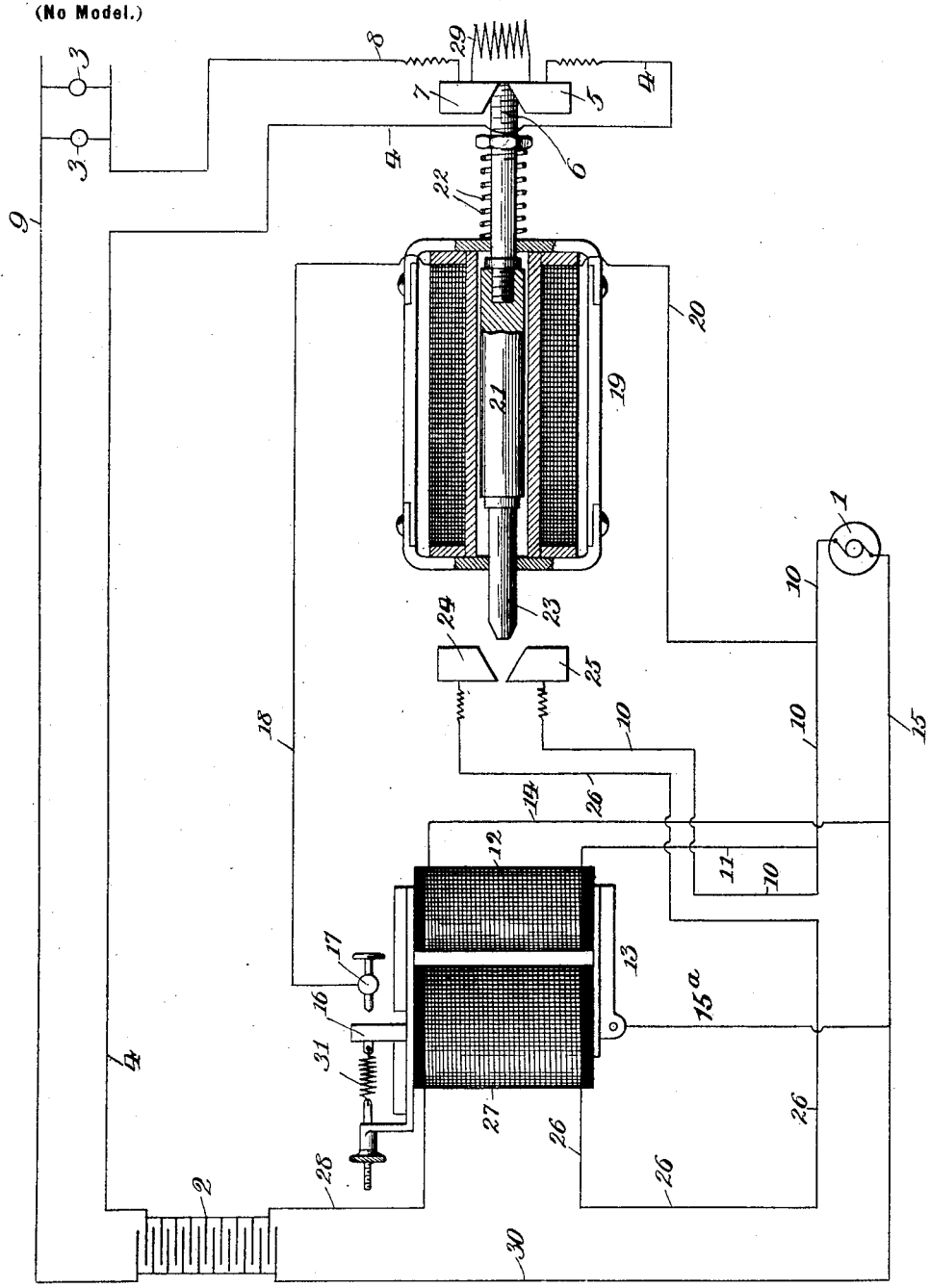
Witnesses:
Chas E Gaylord.
Luti S Peters
Inventors:
Franklin M. Gilbert,
George K. Wheeler.
By Banning & Banning & Sheridan,
Attys.

UNITED STATES PATENT OFFICE.

FRANKLIN M. GILBERT, OF ST. PAUL, MINNESOTA, AND GEORGE K. WHEELER, OF TOPEKA, KANSAS, ASSIGNORS TO THE ELECTRIC AXLE LIGHT & POWER COMPANY, OF NEW YORK, N. Y.

ELECTRIC SWITCH.

SPECIFICATION forming part of Letters Patent No. 669,941, dated March 12, 1901.

Application filed December 17, 1898. Serial No. 699,574. (No model.)

*To all whom it may concern:*

Be it known that we, FRANKLIN M. GILBERT, residing at St. Paul, Ramsey county, Minnesota, and GEORGE K. WHEELER, residing at Topeka, Shawnee county, Kansas, citizens of the United States, have invented an Improvement in Electric Switches, of which the following is a specification.

The invention relates to that class of electric switches known as "automatic" electric switches as used in connection with a dynamo and secondary batteries, the purpose of which is to close and open the switch at the proper dynamo potential and connect and disconnect the dynamo and batteries, all of which will more fully hereinafter appear.

The principal object of the invention is to provide a simple, economical, and efficient potential-switch adapted to be used in connection with a dynamo and secondary batteries and electrically connect and disconnect the same when the dynamo potential reaches a predetermined point.

Other objects of the invention will appear from an examination of the following description and claims.

The invention consists principally in providing a solenoid in which there is combined a winding therefor adapted to be connected with a source of current-supply, a core extending through the same, a pair of contacts at or near each end, and spring mechanism to keep the core normally in engagement with one pair of contacts.

The invention consists, further, in combining with a dynamo and a set of secondary batteries a potential-switch comprising a solenoid provided with a winding electrically connected with the dynamo, a core extending through the solenoid, a pair of contacts at or near each end of the solenoid electrically connected with the dynamo and batteries and adapted to be connected and disconnected by the movements of the core, a relay electrically connected with the dynamo, and an armature arranged to be operated by the magnetic action of the relay when the dynamo potential reaches a predetermined point to make and break the electric connection between the dynamo and solenoid-winding.

The invention consists, further, in the features, combinations, and details of construction hereinafter described and claimed.

In the accompanying drawing the figure is a diagrammatic view of our switch as it appears when arranged for use.

In the art to which this invention relates, and especially when an electric generator in the form of a dynamo is used in combination with a set of storage batteries for the purpose of furnishing current to electric lights or other apparatus, it is well known that if the generator and battery be in electric connection when the potential of the dynamo is below the potential furnished by the battery the back pressure or flow of current from the batteries to the generator would either serve to operate the generator as a motor or destroy the machine. Our invention, therefore, is intended, primarily, to provide means in the shape of a switch and interpose it between the generator and the batteries, so that the circuit is opened below and closed above a certain potential of generator.

In constructing our improvement we use a dynamo 1 and a set of secondary batteries 2, the dynamo being used, primarily, to charge the batteries and the energy of the batteries or their normal pressure to be used in operating a system of electric lights 3 or other electrical apparatus.

Describing the diagrammatic view and supposing the batteries to furnish a pressure of forty-five volts, current will flow from the batteries through wire 4, contact 5, switch 6, contact 7, and wire 8 to the lights and over wire 9 back to the battery. It is now desirable to start the generator, and when the parts are in the position shown in diagram current will flow from the dynamo through wire 10, from which it is taken off and shunted through wire 11, through the windings of the spool 12 in the polarized relay 13, back by wire 14 to the main line 15, through which it returns to the dynamo. When the dynamo potential has been built up to the desired pressure—say forty-seven volts—the spool is energized, so that the armature 16 is drawn over to contact the terminal 17, and current flows through wires 15 and 15ª, armature 16, contact 17, wire 18, and through the windings of the switch-solenoid 19 back through wires 20 and 10 to the dynamo. This action energizes the solenoid, so that its core 21 overcomes the tension of the coil-spring 22 and forces its switch 23 into connection with and to electrically connect the contacts 24 and 25. When the parts assume the position above outlined, current flows from the generator through wire 10 to contact 25, switch 23, contact 24, wire 26, and spool 27, where it adds its increment to hold armature 16 in contact with terminal 17, and from such spool through wire 28 to the battery, over wire 4, contact 5, resistance-coil 29, contact 7, wire 8, through translating devices 3, over wire 9 to the battery, and over through wires 30 and 15 to the generator. It is evident, therefore, that the dynamo supplies simultaneously the lamps 3 and the storage batteries 2 and that both translating devices are in parallel with one another and connected across the circuit of the dynamo 1. Assuming the pressure to fall below such forty-five volts, the tension of the spring 31 overcomes the magnetic attraction of the spool 12, breaks the circuit that energizes the solenoid 19, and permits the spring 22 to move the switch into connection with the contacts 5 and 7, thus opening the main switch and at the same time cutting out the auxiliary resistance 29 used for protecting the lights from the fluctuations of the generator.

It will thus be seen that when the generator is creating potential higher than that furnished by the battery the dynamo-circuit is closed, thus allowing the battery to be charged and introducing a resistance between the battery and the lights to protect the lights from the fluctuating voltage of the machine, and that when the potential of the generator falls below a certain pressure — say forty-five volts—the dynamo-circuit is open to prevent a reversal of the motor or the destruction of the machine.

While we have described our invention with more or less minuteness as regards details, we do not desire to be limited thereto unduly or any more than is pointed out in the claims. On the contrary, we contemplate all proper changes in form, construction, and arrangement, as circumstances may suggest or necessity render expedient.

We claim—

1. The combination with a dynamo and a storage battery, of a potential-switch consisting of a relay connected to said dynamo, a solenoid-magnet whose winding is also connected with said dynamo, an armature for said relay for including or excluding the winding of said solenoid-magnet, a core for said solenoid-magnet, and a pair of electric contacts at or near each end of the solenoid electrically connected with said battery and said dynamo, opened or closed by said core, substantially as described.

2. The combination with a dynamo, storage battery, main circuit of a potential-switch consisting of a relay and a solenoid-magnet, both electrically connected with said dynamo, an armature for said relay actuating the circuit connections of the solenoid-magnet, winding-contacts located at both ends of said solenoid-magnets, some of which are connected to said dynamo and others to said storage battery, a movable core for said solenoid-magnet engaging alternately with contacts on one side of the solenoid by magnetic action and by spring mechanism on the other side, substantially as described.

3. In combination with a dynamo and set of secondary batteries, a potential-switch, in which there is combined a two-spool polarized relay having one spool electrtrically connected with the dynamo and the winding of the other spool with dynamo and battery, a solenoid provided with a winding electrically connected with the dynamo, an armature operating by the magnetic action of the first relay-spool when the potential pressure of the dynamo reaches a predetermined point, to close the solenoid-winding circuit, a spring for operating the armature to break the solenoid-winding circuit when the potential of the dynamo falls below a predetermined point, a pair of contacts arranged adjacent to the solenoid and electrically connected with the dynamo and battery, a second pair of contacts arranged adjacent to the solenoid and electrically connected with the battery-terminals, a core extending through the solenoid and operated by the magnetic action of the same to make or break electric connection between the first-named contacts, and spring mechanism to operate the core when the solenoid is deënergized and make electrical connection between the second pair of contacts, substantially as described.

4. In combination with a dynamo and set of secondary batteries, a potential-switch in which there is combined a relay electrically connected with the dynamo, a solenoid provided with a winding electrically connected with the dynamo, an armature operating by the magnetic action of the relay when the potential of the dynamo reaches a predetermined point to close the solenoid-winding circuit, spring mechanism for operating the armature to break the solenoid-winding circuit when the potential of the dynamo falls below a predetermined point, a pair of electric contacts arranged adjacent to the solenoid and electrically connected with the dynamo and batteries, a second pair of contacts arranged adjacent to the solenoid and electrically connected with the dynamo and batteries and electrical apparatus to be supplied with current, a resistance interposed between the contacts of a second pair, a core extending through the solenoid and operated by the magnetic action of the same to make and break electric connection between the first-named contacts, and spring mechanism to operate the core when the solenoid is deënergized and make electric connection between the second pair of contacts and cut out the resistance, substantially as described.

FRANKLIN M. GILBERT.
GEORGE K. WHEELER.

Witnesses to the signature of Franklin M. Gilbert:
ALEX. R. SPEEL,
CHAS. CONRADIS.

Witnesses to the signature of George K. Wheeler:
GEO. C. F. ROBERTS,
J. B. SIAS.